(12) United States Patent
Kano

(10) Patent No.: US 10,150,528 B2
(45) Date of Patent: Dec. 11, 2018

(54) FOLDING VEHICLE

(71) Applicant: TOYODA IRON WORKS CO., LTD., Toyota-shi, Aichi (JP)

(72) Inventor: Mitsutoshi Kano, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 15/596,510

(22) Filed: May 16, 2017

(65) Prior Publication Data

US 2017/0247075 A1    Aug. 31, 2017

Related U.S. Application Data

(63) Continuation of application No. PCT/JP2015/074203, filed on Aug. 27, 2015.

(30) Foreign Application Priority Data

Jan. 13, 2015    (JP) .................................. 2015-004093

(51) Int. Cl.
*B62K 13/08* (2006.01)
*B62K 5/06* (2006.01)
(Continued)

(52) U.S. Cl.
CPC ............ *B62K 13/08* (2013.01); *A63C 17/011* (2013.01); *B62K 3/002* (2013.01); *B62K 5/06* (2013.01);
(Continued)

(58) Field of Classification Search
CPC ........ A63C 17/011; B62K 5/06; B62K 15/00; B62K 15/006; B62K 15/008; B62K 3/00; B62J 1/08; B62J 1/00
(Continued)

(56) References Cited

U.S. PATENT DOCUMENTS 3,511,521 A * 5/1970 Gobini .................. B62K 11/06
  280/270
3,572,757 A * 3/1971 Camps ................. B62K 15/008
  180/208

(Continued)

FOREIGN PATENT DOCUMENTS

CN    2706392 Y    6/2005
CN    104053594 A    9/2014
(Continued)

OTHER PUBLICATIONS

Sep. 5, 2017 Office Action issued in Japanese Patent Application No. 2015-004093.
(Continued)

*Primary Examiner* — James A Shriver, II
*Assistant Examiner* — Brian L Cassidy
(74) *Attorney, Agent, or Firm* — Oliff PLC

(57) ABSTRACT

A saddle member is attached to at least one of an upper end portion of a first frame member and an upper end portion of a second frame member of a main frame mechanism and remains to be in a state of being attached to at least one of the upper end portion of the first frame member and the upper end portion of the second frame member in a folded mode, a seated driving mode, and a standing driving mode, with locking function of a third lock mechanism.

6 Claims, 11 Drawing Sheets

(51) Int. Cl.
*B62K 15/00* (2006.01)
*A63C 17/01* (2006.01)
*B62K 3/00* (2006.01)
*B62K 13/04* (2006.01)

(52) U.S. Cl.
CPC .............. *B62K 13/04* (2013.01); *B62K 15/00* (2013.01); *B62K 15/008* (2013.01)

(58) Field of Classification Search
USPC .......................................... 280/87.05, 87.041
See application file for complete search history.

(56) References Cited

U.S. PATENT DOCUMENTS

| | | | | |
|---|---|---|---|---|
| 3,887,218 | A * | 6/1975 | Di Blasi | B62K 11/00 180/208 |
| 3,979,136 | A * | 9/1976 | Lassiere | B62K 15/006 280/236 |
| 4,026,573 | A * | 5/1977 | Richardson | B62K 11/02 180/208 |
| 4,611,818 | A * | 9/1986 | Cammarata | B62K 15/006 280/278 |
| 5,183,129 | A * | 2/1993 | Powell | B62K 3/002 180/208 |
| 5,186,482 | A * | 2/1993 | Sapper | B62K 15/008 280/278 |
| 6,588,787 | B2 * | 7/2003 | Ou | B62K 11/10 180/220 |
| 6,695,334 | B2 * | 2/2004 | Irlbacher | B62K 15/008 280/278 |
| 6,799,771 | B2 | 10/2004 | Bigot | |
| 7,021,413 | B1 * | 4/2006 | Lee | B62K 3/002 180/180 |
| 7,967,095 | B2 * | 6/2011 | Kosco | B62K 5/025 180/208 |
| 9,010,780 | B1 * | 4/2015 | Chiu | B62J 1/08 280/87.05 |
| 9,016,702 | B2 * | 4/2015 | Huang | B62J 1/08 280/87.041 |
| 9,254,883 | B2 | 2/2016 | Berndorfer et al. | |
| 9,517,809 | B2 | 12/2016 | Berndorfer et al. | |
| 9,533,729 | B1 * | 1/2017 | Chan | B62K 15/006 |
| 9,796,443 | B2 * | 10/2017 | Eckert | B62K 13/08 |
| 2004/0032110 | A1 | 2/2004 | Bigot | |
| 2004/0178604 | A1 * | 9/2004 | Ma | B62K 15/008 280/278 |
| 2005/0161898 | A1 * | 7/2005 | Chao | B62K 15/00 280/278 |
| 2005/0173175 | A1 | 8/2005 | Lee | |
| 2006/0097476 | A1 | 5/2006 | Kobayashi | |
| 2009/0020350 | A1 * | 1/2009 | Wu | B62K 5/025 180/208 |
| 2012/0193160 | A1 * | 8/2012 | Wu | B62K 5/007 180/208 |
| 2014/0203538 | A1 | 7/2014 | Huang | |
| 2015/0042053 | A1 | 2/2015 | Berndorfer et al. | |
| 2015/0209205 | A1 * | 7/2015 | Ransenberg | B62K 15/008 280/641 |
| 2016/0009331 | A9 | 1/2016 | Berndorfer et al. | |
| 2016/0107716 | A1 | 4/2016 | Berndorfer et al. | |
| 2016/0200389 | A1 * | 7/2016 | Chen | B62K 9/00 280/639 |
| 2016/0236744 | A1 * | 8/2016 | Bailie | B62K 15/008 |
| 2016/0297495 | A1 * | 10/2016 | He | B62K 15/008 |
| 2017/0190377 | A1 * | 7/2017 | Ku | B62D 61/04 |
| 2018/0065703 | A1 * | 3/2018 | Li | B62K 15/008 |

FOREIGN PATENT DOCUMENTS

| | | |
|---|---|---|
| DE | 102013003484 A1 | 8/2013 |
| EP | 2336014 A1 | 6/2011 |
| ES | 1107807 U | 4/2014 |
| JP | S49-135343 A | 12/1974 |
| JP | 2004-106781 A | 4/2004 |
| JP | 2004-525019 A | 8/2004 |
| JP | 3103452 U | 8/2004 |
| JP | 4117660 B2 | 7/2008 |
| JP | 2012-224186 A | 11/2012 |
| JP | 3189751 U | 3/2014 |
| JP | 2015-128921 A | 7/2015 |
| JP | 2015-157521 A | 9/2015 |
| WO | 2014/207774 A1 | 12/2014 |

OTHER PUBLICATIONS

Nov. 17, 2015 International Search Report issued in International Patent Application No. PCT/JP2015/074203.
Jul. 18, 2017 International Preliminary Report on Patentability issued in International Patent Application No. PCT/JP2015/074203.
Mar. 6, 2018 Office Action issued in Japanese Patent Application No. 2015-004093.
Aug. 1, 2018 Extended Search Report issued in European Patent Application No. 15877895.1.
Aug. 3, 2018 Office Action issued in Chinese Patent Application No. 201580049022.X.
Oct. 2, 2018 Office Action issued in Japanese Patent Application No. 2015-004093.

\* cited by examiner

FOLDING VEHICLE

CROSS-REFERENCE TO RELATED APPLICATION

This application is based upon and claims the benefit of priority of the prior Japanese Patent Application No. 2015-004093, filed on Jan. 13, 2015, the entire contents of which are incorporated herein by reference.

FIELD

The present disclosure relates to a folding vehicle switchable among three modes including a folded mode, a seated driving mode, and a standing driving mode.

BACKGROUND

Conventionally, various folding vehicles have been proposed. For example, Japanese Patent No. 4117660 discloses a folding bicycle having the following configuration. Specifically, a handle strut and a wheel supporting frame are engaged with each other in a pivotable and fixable manner, via a folding mechanism that can pivot about an axis provided in a left and right direction. A coupling mechanism that can pivot about an axis provided in a front and rear direction is provided to the wheel supporting frame. A rear wheel can be fixed to and rotate about the wheel supporting frame as an axis.

This folding bicycle is switchable among three modes including a folded mode by being folded, a seated driving mode, and a standing driving mode.

SUMMARY

According to an aspect of the embodiments, a folding vehicle includes: a front frame, the front frame including: an upper end to which a handle is attached; and a lower end to which a front wheel is attached; a based frame by which the front frame is pivotally supported; a main frame mechanism, the main frame mechanism including: a first frame member pivotally supported with respect to the base frame; and a second frame member arranged in parallel with the first frame member, wherein the first frame member and the second frame member form a parallel link mechanism; a board attached to the main frame mechanism; a saddle member attached to at least one of an upper end portion of the first frame member and an upper end portion of the second frame member of the main frame mechanism; and a swing arm, the swing arm including: one end pivotally supported by the main frame mechanism; and another end by which a pair of rear wheels are rotatably supported, wherein the folding vehicle is switchable among: a first mode, in which the main frame mechanism is folded, achieved by pivoting the main frame mechanism toward the front frame; a second mode, in which driving while being seated on the saddle member is enabled, achieved by pivoting the main frame mechanism in the first mode; and a third mode, in which driving while standing on the board is enabled, achieved by pivoting the main frame mechanism in the second mode, and wherein the saddle member remains to be in a state of being attached to at least one of the upper end portion of the first frame member and the upper end portion of the second frame member in the first mode, the second mode, and the third mode.

The object and advantages of the invention will be realized and attained by means of the elements and combinations particularly pointed out in the claims.

It is to be understood that both the forgoing general description and the following detailed description are exemplary and explanatory and are not restrictive of the invention.

DESCRIPTION OF EMBODIMENTS

A saddle of the conventional folding bicycle is not obstructive in the folded mode and is used in the seated driving mode. Thus, the saddle remains to be attached in these two states. However, the saddle is obstructive and thus is removed in the standing driving mode.

The saddle removed while the folding bicycle is in the standing driving mode needs to be separately kept, and thus has a risk of being lost in some cases.

In the standing driving mode with the saddle removed, driving is hindered by a saddle supporting frame, for fixing the saddle, to be difficult.

The present disclosure is made to solve the conventional problem described above, and an object of an embodiment of the present disclosure is to provide a folding vehicle that can be in all of a folded mode, a seated driving mode, and a standing driving mode without removing a saddle member from a main frame mechanism, and can achieve the standing driving mode with driving not hindered by the saddle member.

The folding vehicle according to the embodiment of the present disclosure is described with reference to the drawings.

First of all, a basic configuration of the folding vehicle according to the embodiment is described with reference to FIG. 1 to FIG. 6.

Figure 2:
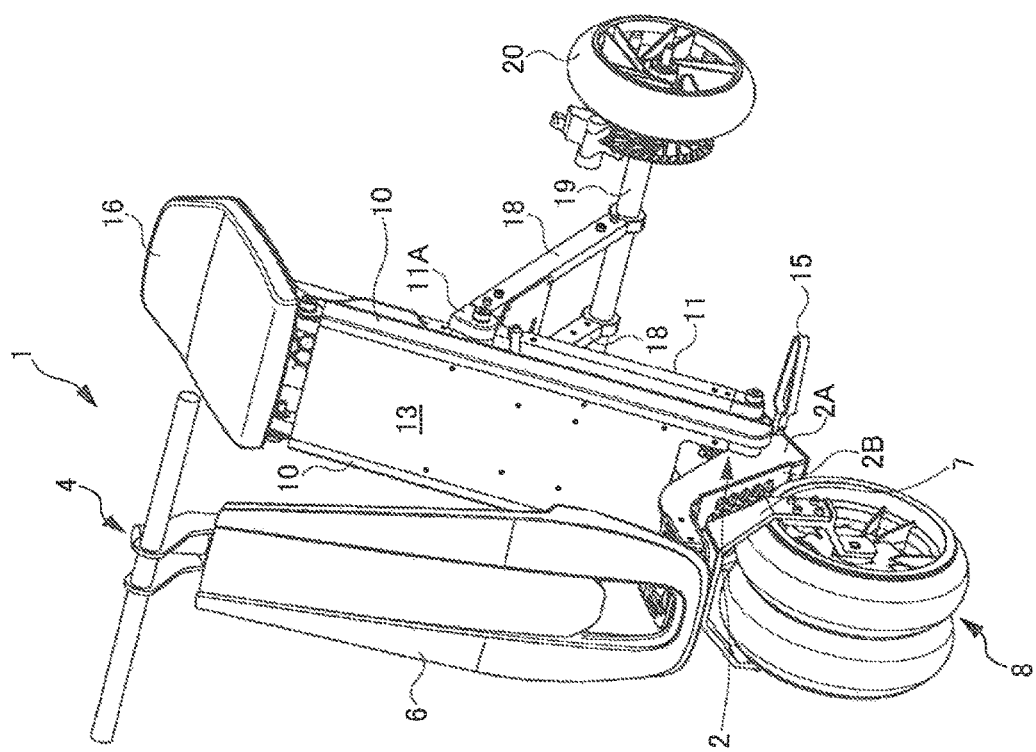
FIG. 2 is a front perspective view of the folding vehicle set in the seated driving mode.
Figure 4:
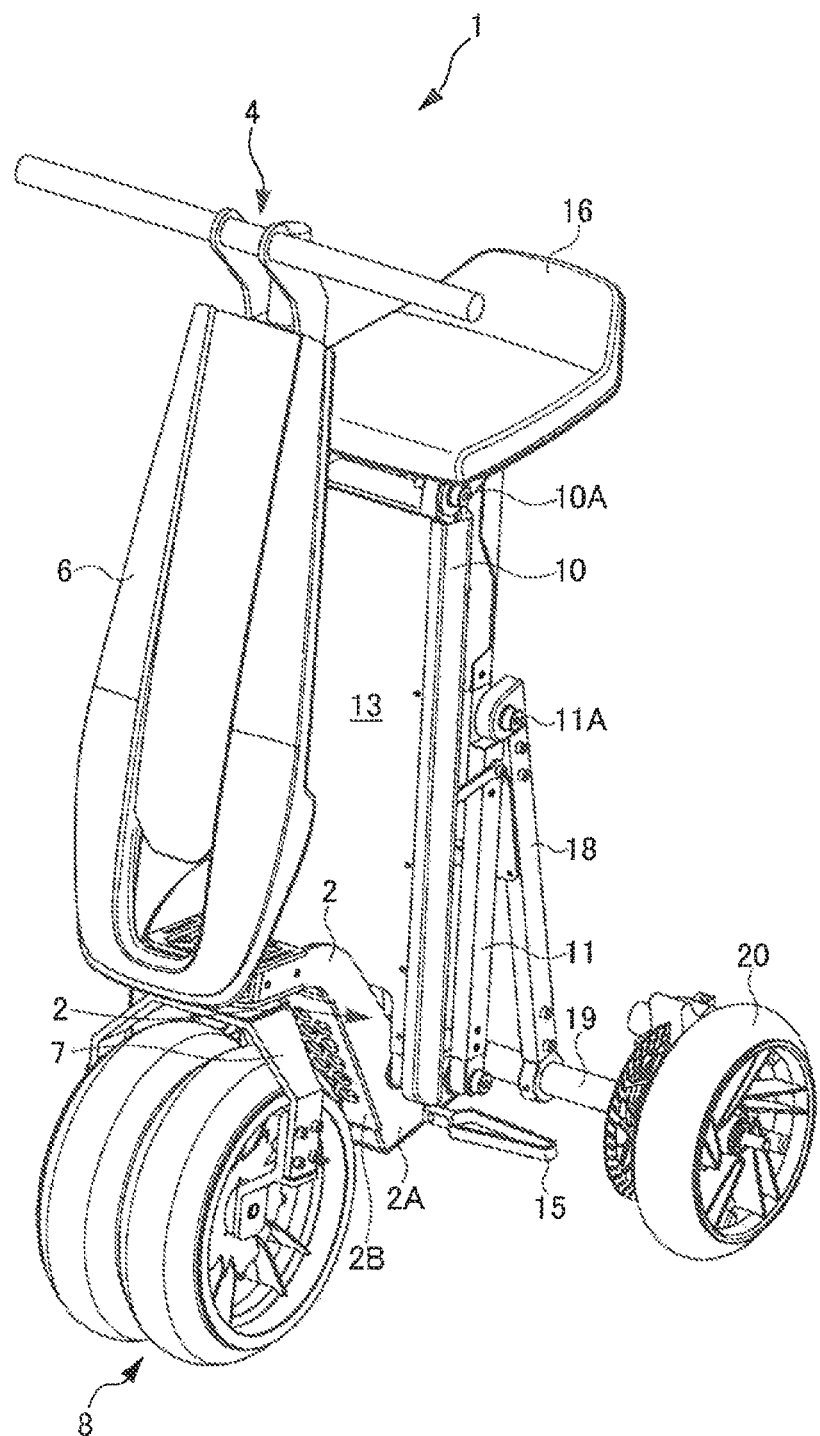
FIG. 4 is a front perspective view of the folding vehicle set in the folded mode.
Figure 6:
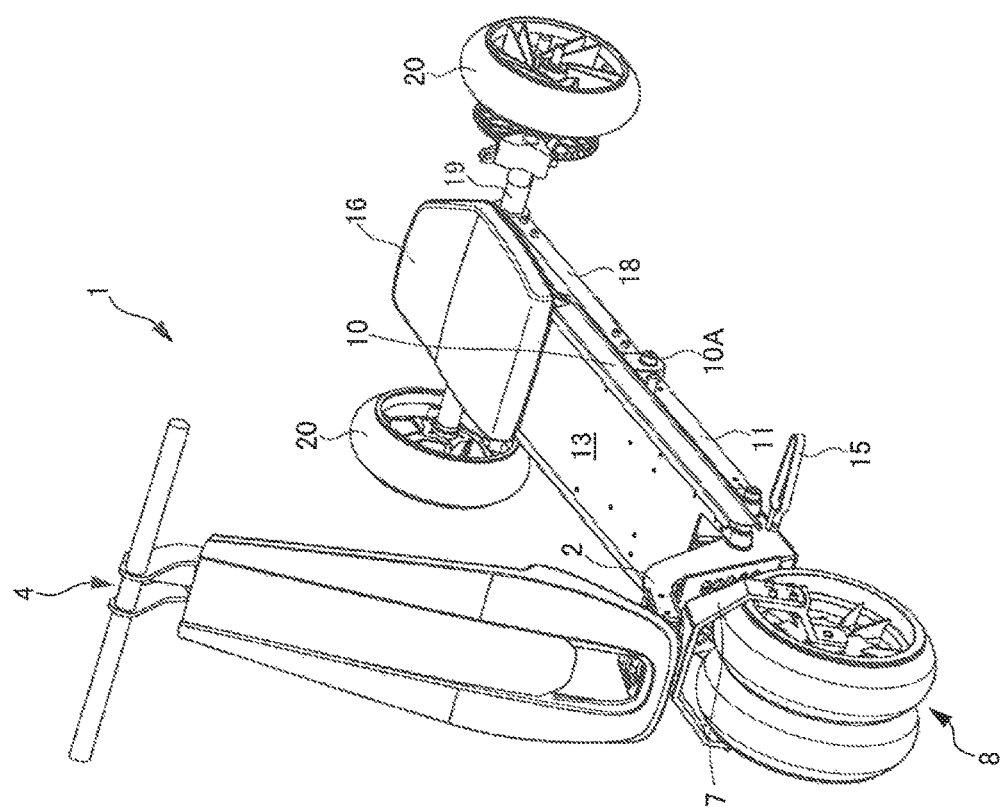
FIG. 6 is a front perspective view of the folding vehicle set in the standing driving mode.

The folding vehicle 1 includes a base frame 2 having the following form. Specifically, as illustrated in FIG. 2, FIG. 4, and FIG. 6, the base frame 2 includes a pair of side plates 2A and 2A, having a curved shape in side view, integrally coupled with each other via a fiat plate 2B.

A front frame 3 is attached to a front portion of the base frame 2 pivotally in a substantially horizontal direction. A handle 4 is fixed to an upper end of the front frame 3. A cover 6 is attached to a front side of the front frame 3 via attachment members 5 and 5.

A wheel supporting frame 7 is fixed to a lower end of the front frame 3. A front wheel 8 is rotatably supported by the wheel supporting frame 7. The front wheel 8 incorporates an inline motor (not illustrated) that is driven by a battery 14 described later. The inline motor has a known configuration and thus will not be described in detail herein.

The main frame mechanism 9 is pivotally supported by both rear side portions of the base frame 2. The main frame mechanism 9 includes: first frame members 10 pivotally supported by outer surface upper portions of the side plates 2A, via a pivotally supporting member 2C; and second frame members 11 pivotally supported by outer surface lower portions of the side plates 2A, via a pivotally supporting member 2D, while being in parallel with the first frame members 10, at a position separated from the first frame members 10 by a predetermined distance. The first frame member 10 and the corresponding second frame member 11 are coupled to each other via a link member 12 in parallel with a line A passing through a pivot center of the first frame member 10 at the pivotally supporting member 2C and a pivot center of the second frame member 11 at the pivotally supporting member 2D. Thus, the first frame member 10 and the second frame member 11 form a parallel link mechanism.

A board 13 is disposed between the two first frame members 10 in parallel with each other (see FIG. 2). The battery 14, connected to the inline motor that drivingly rotates the front wheel 8, is disposed on a lower surface side of the board 13. A footrest 15 is attached to each of the side plates 2A of the base frame 2.

A first lock mechanism L1, described later, is provided between the first frame members 10 of the main frame mechanism 9 and the base frame 2.

The saddle member 16 is attached to upper end portions of the first frame members 10 and the second frame members 11 in the main frame mechanism 9. More specifically, the saddle member 16 is pivotally attached to the upper end portions of the two first frame members 10 via pivotally supporting members 10A in a front portion of a supporting plate 17 provided on a lower surface of the saddle member 16. A third lock mechanism L3 is provided between a rear portion of the supporting plate 17 and the upper end portions of the second frame members 11. The saddle member 16 can pivot in a counterclockwise direction from a state illustrated in FIG. 1 and FIG. 3, based on locking and unlocking functions of the third lock mechanism L3, described later.

A pair of swing arms 18 each have one end pivotally supported by a substantially center portion of a corresponding one of the second frame members 11 in a longitudinal direction via pivotally supporting members 11A. The swing arms 18 each have the other end pivotally supporting a shaft 19 (see FIG. 2). A pair of rear wheels 20 and 20 (see FIG. 6) are rotatably supported on both ends of the shaft 19.

A second lock mechanism L2, described later, is provided between the second frame members 11 and the swing arms 18.

Next, the first lock mechanism L1 provided between the first frame members 10 of the main frame mechanism 9 and the base frame 2 is described with reference to FIG. 7.

Figure 7A:
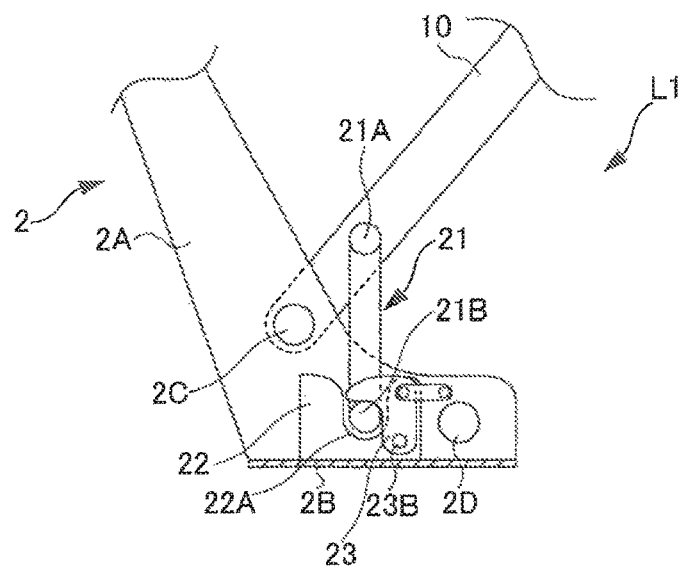
FIGS. 7A, 7B are diagrams schematically illustrating a first lock mechanism provided between a base frame and a main frame mechanism.
Figure 7B:
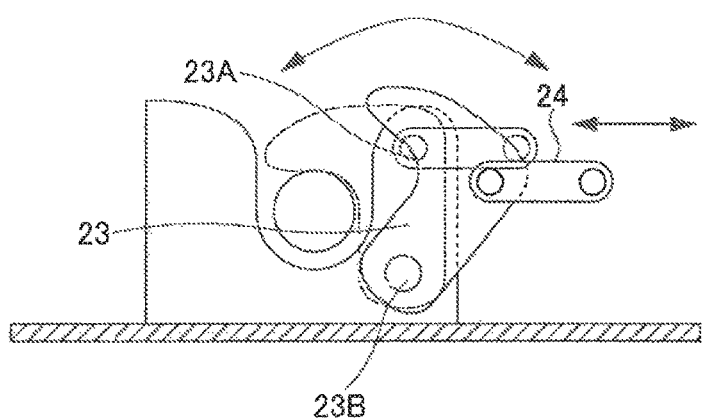

In FIGS. 7A and 7B, a striker 21, as a link member, is pivotally supported at the first frame member 10 of the main frame mechanism 9 via a supporting portion 21A. The striker 21 is a rod-shaped member having a substantially U shape in plain view. In FIG. 7A, the striker 21 has as a lower portion serving as an engaged portion 21B engaged with a hook portion 23A of a hook member 23 described later.

A receiving member 22 is fixed to the flat plate 2B in a bottom portion of the base frame 2. A U-shaped groove 22A having a U shape in side view is formed on the receiving member 22. The hook member 23 including the hook portion 23A is pivotally supported at the receiving member 22 via a supporting member 23B. The hook member 23 is constantly urged in the counterclockwise direction by a spring incorporated therein.

A release lever 24 has one end coupled with the hook member 23. When the other end of the release lever 24 is pulled in a right direction in FIGS. 7A and 7B, against urging force of the spring in an appropriate way, the hook portion 23A of the hook member 23 engaged with the engaged portion 21B of the striker 21 is pivoted in a clockwise direction. Thus, the engagement between the engaged portion 21B of the striker 21 and the hook portion 23A of the hook member 23 is released.

The main frame mechanism 9 is locked with the base frame 2, with the first lock mechanism L1 having the configuration described above, in the following manner. Specifically, as illustrated in FIG. 7A, the engaged portion 21B of the striker 21 is set up in the U-shaped groove 22A of the receiving member 22, and the hook member 23 is pivoted in the counterclockwise direction by the urging force of the spring. Thus, the base frame 2 and the main frame mechanism 9 are locked as in a state illustrated in FIG. 7A.

The locking between the base frame 2 and the main frame mechanism 9 can be released by pulling the release lever 24 in the right direction in FIG. 7B and releasing the engagement between the engaged portion 21B of the striker 21 and the hook portion 23A of the hook member 23.

Next, the second lock mechanism L2 provided between the second frame member 11 of the main frame mechanism 9 and the swing arm 18 is described with reference to FIG. 8.

Figure 8:
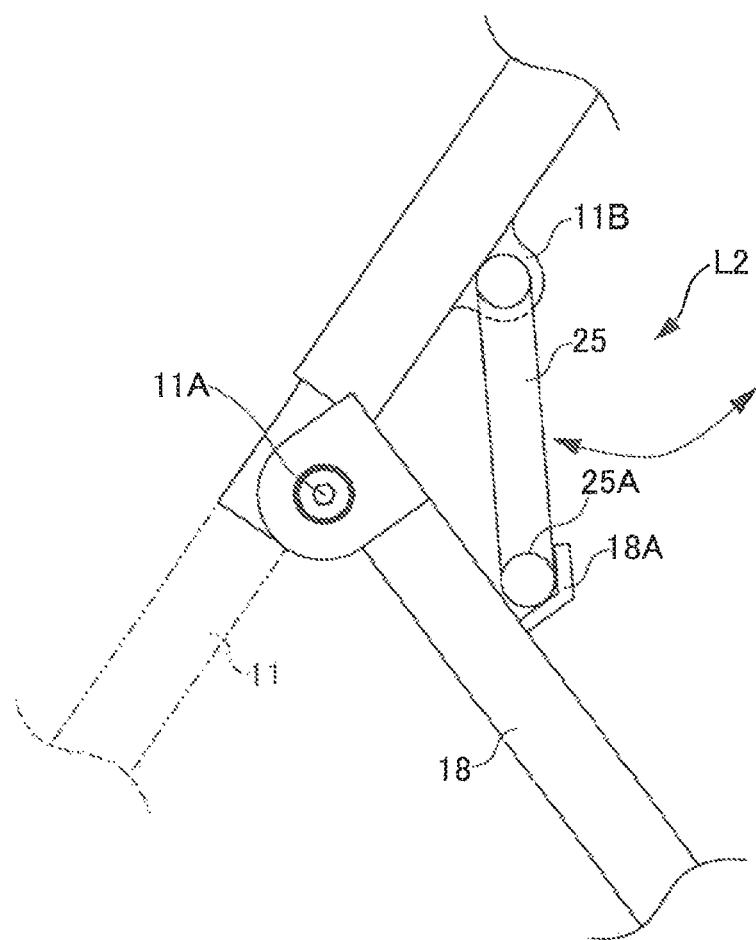
FIG. 8 is a diagram schematically illustrating a second lock mechanism provided between the main frame mechanism and swing arms.

In FIG. 8, a rod member 25 has one end pivotally supported at a position of the second frame member 11 above the pivotally supporting member 11A pivotally supporting the swing arm 18, via the pivotally supporting member 11B. A stopper engaging portion 25A having a rod shape is formed at the other end of the rod member 25.

A stopper member 18A is formed on the swing arm 18 pivotally supported by the second frame member 11 via the pivotally supporting member 11A. The stopper engaging portion 25A of the rod member 25 is engaged with the stopper member 18A from the above.

The second frame member 11 and the swing arm 18 can be locked, with the second lock mechanism L2 having the configuration described above, in the following manner. Specifically, the second frame member 11 and the swing arm 18 are pivoted with respect to each other, and the stopper engaging portion 25A of the rod member 25 is engaged with the stopper member 18A of the swing arm 18. The engaging can be released by pivoting the second frame member 11 and the swing arm 18 with respect to each other, and detaching the stopper engaging portion 25A of the rod member 25 from the stopper member 18A of the swing arm 18.

Next, the third lock mechanism L3 provided between the rear portion of the supporting plate 17 of the saddle member 16 and the upper end portion of the second frame member 11 is described with reference to FIG. 9. In FIG. 9, the supporting plate 17 is omitted to facilitate the understanding.

Figure 9A:
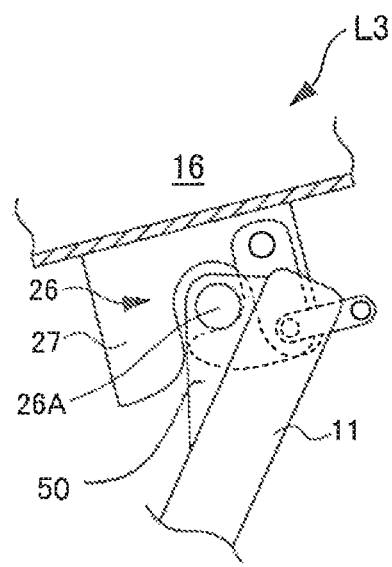
FIGS. 9A, 9B are diagrams schematically illustrating a third lock mechanism provided between the main frame mechanism and a saddle member.

The striker 26 is a linear rod-shaped member bridging between supporting members 50 attached to the upper end portions of the two second frame members 11, and serves as an engaged portion 26A engaging with a hook portion 28A of a hook member 28 described later as illustrated in FIG. 9A.

The receiving member 27, on which a U-shaped groove 27A having a U shape in side view is formed, is fixed on a bottom portion of the saddle member 16. The hook member 28 including the hook portion 28A is pivotally supported at the receiving member 27 via a supporting member 28B. The hook member 28 is constantly urged in the clockwise direction by a spring incorporated therein.

A release lever 29 has one end coupled with the hook member 28. When the other end of the release lever 29 is pulled in the right direction in FIGS. 9A and 9B, against urging force of the spring in an appropriate way, the hook portion 28A of the hook member 28 engaged with the engaged portion 26A of the striker 26 is pivoted in the counterclockwise direction. Thus, the engagement between the engaged portion 26A of the striker 26 and the hook portion 28A of the hook member 28 is released.

The saddle member 16 and the upper end of the second frame member 11 are locked, with the third lock mechanism L3 having the configuration described above, in the following manner. Specifically, as illustrated in FIG. 9A, the engaged portion 26A of the striker 26 is set up in the U-shaped groove 27A of the receiving member 27, and the hook member 28 is pivoted in the clockwise direction by the urging force of the spring. Thus, the saddle member 16 and the second frame member 11 are locked as in a state illustrated in FIG. 9A.

Figure 9B:
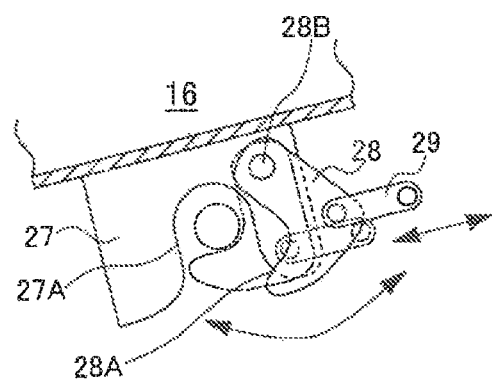

The locking of the saddle member 16 and the second frame member 11 can be released by pulling the release lever 29 in the right direction in FIGS. 9A and 9B and releasing the engagement between the engaged portion 26A of the striker 26 and the hook portion 28A of the hook member 28.

Figure 10:
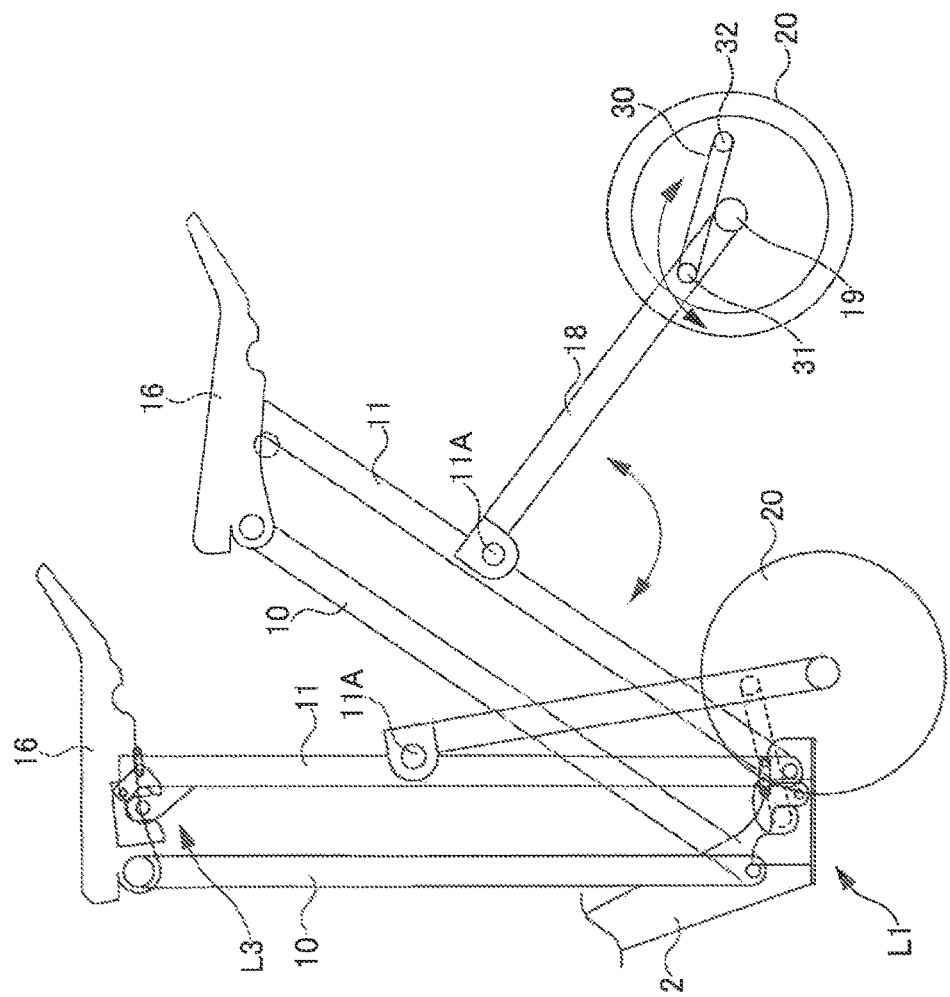
FIG. 10 is a diagram schematically illustrating an operation transitioning from the folded mode to the seated driving mode or from the seated driving mode to the folded mode of the folding vehicle.

As illustrated in FIG. 10, a striker 30, having a configuration similar to that of the striker 21, is pivotally supported at a rear end portion of the swing arm 18 (around a right end portion in FIG. 10) via a pivotally supporting portion 31. The striker 30 is a rod-shaped member having a substantially U shape in plain view, and has an engaged portion 32 engaged with the hook portion 23A of the hook member 23 in the first lock mechanism L1, on the side opposite to the pivotally supporting portion 31, as described below.

Next, a relationship between the lock mechanisms described above and the folding vehicle 1 in the folded mode, the seated driving mode, and the standing driving mode is described.

Figure 1:
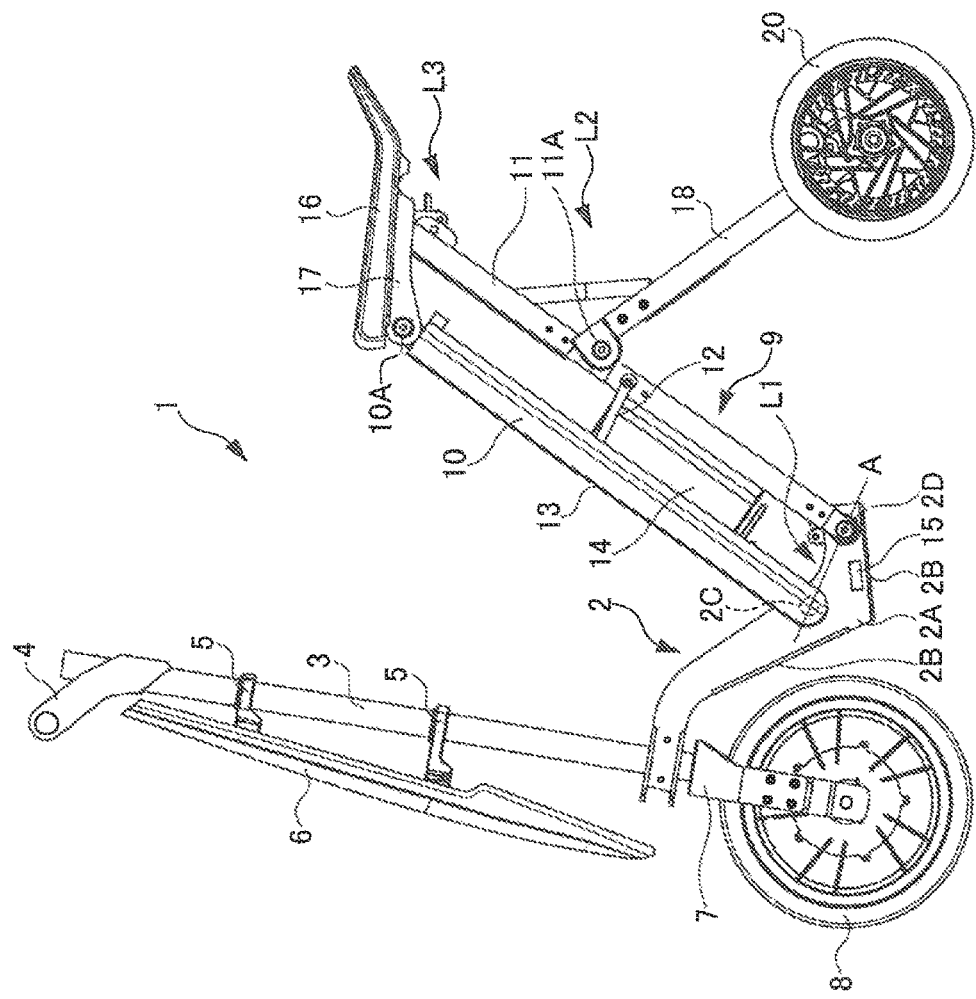
FIG. 1 is a side view of a folding vehicle according to an embodiment of the present disclosure set in a seated driving mode.

To begin with, the folding vehicle 1 is assumed to be in the seated driving mode as illustrated in FIGS. 1 and 2.

When the folding vehicle 1 is in the seated driving mode, the first lock mechanism L1 and the second lock mechanism L2 are each in the locked state.

More specifically, as illustrated in FIG. 7A, the engaged portion 21B of the striker 21 in the first lock mechanism L1 is set up in the U-shaped groove 22A of the receiving member 22, and the hook portion 23A of the hook member 23 is engaged with the engaged portion 21B of the striker 21.

As illustrated in FIG. 8, the stopper engaging portion 25A of the rod member 25 of the second lock mechanism L2 is engaged with the stopper member 18A of the swing arm 18.

As a result, the seated driving mode is maintained with the first lock mechanism L1 and the second lock mechanism L2 cooperating to lock the base frame 2 and the main frame mechanism 9 to achieve the state illustrated in FIG. 1, FIG. 2, FIG. 7A, and FIG. 8. Thus, a driver can enjoy safe driving while being seated on the saddle member 16.

Figure 3:
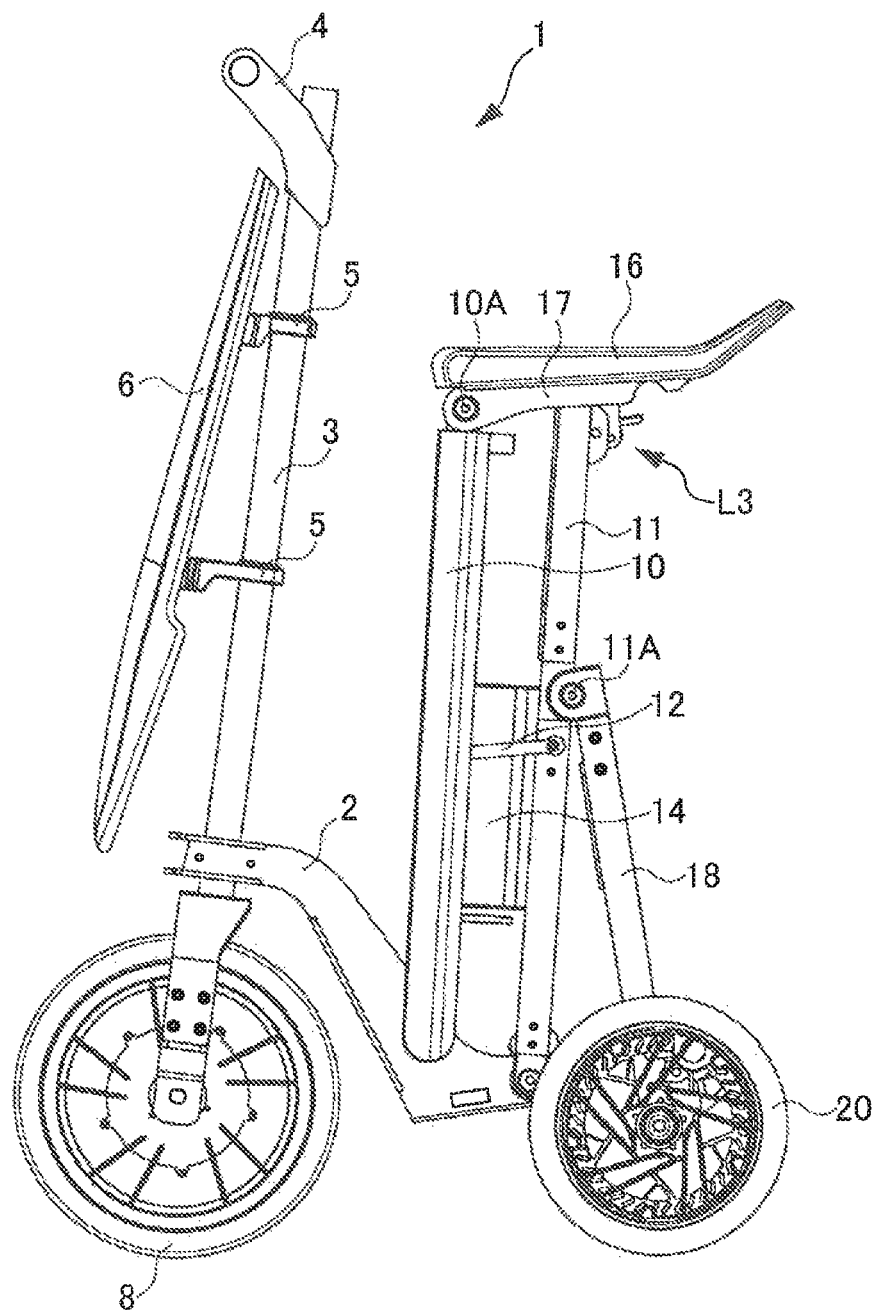
FIG. 3 is a side view of the folding vehicle set in a folded mode.

The seated driving mode transitions to the folded mode illustrated in FIGS. 3 and 4 in the following manner. First of all, the release lever 24 is pulled in the right direction in FIG. 7B to release the locking of the base frame 2 and the main frame mechanism 9. Thus, the engagement between the engaged portion 21B of the striker 21 and the hook portion 23A of the hook member 23 is released, whereby the locking by the first lock mechanism L1 is released. The second frame member 11 and the swing arm 18 are pivoted with respect to each other, and thus the stopper engaging portion 25A of the rod member 25 is detached from the stopper member 18A of the swing arm 18, whereby the locking by the second lock mechanism L2 is released.

Then, the main frame mechanism 9, which has become pivotable with respect to the base frame 2 as a result of the above process, is pivoted toward the front frame 3. In this process, the second lock mechanism L2 is unlocked, and thus the swing arm 18 approaches the front frame 3 as the main frame mechanism 9 pivots. Thus, the main frame mechanism 9 and the swing arm 18 are in the folded mode illustrated in FIGS. 3 and 4.

In the folded mode, the engaged portion 32 of the striker 30 pivotally supported at the swing arm 18 is set up in the U-shaped groove 22A of the receiving member 22 in the first lock mechanism L1, and the hook portion 23A of the hook member 23 is engaged.

Thus, in the folded mode, the main frame mechanism 9 can be prevented from pivoting from the front frame 3, whereby the folded mode can be stably maintained.

Figure 5:
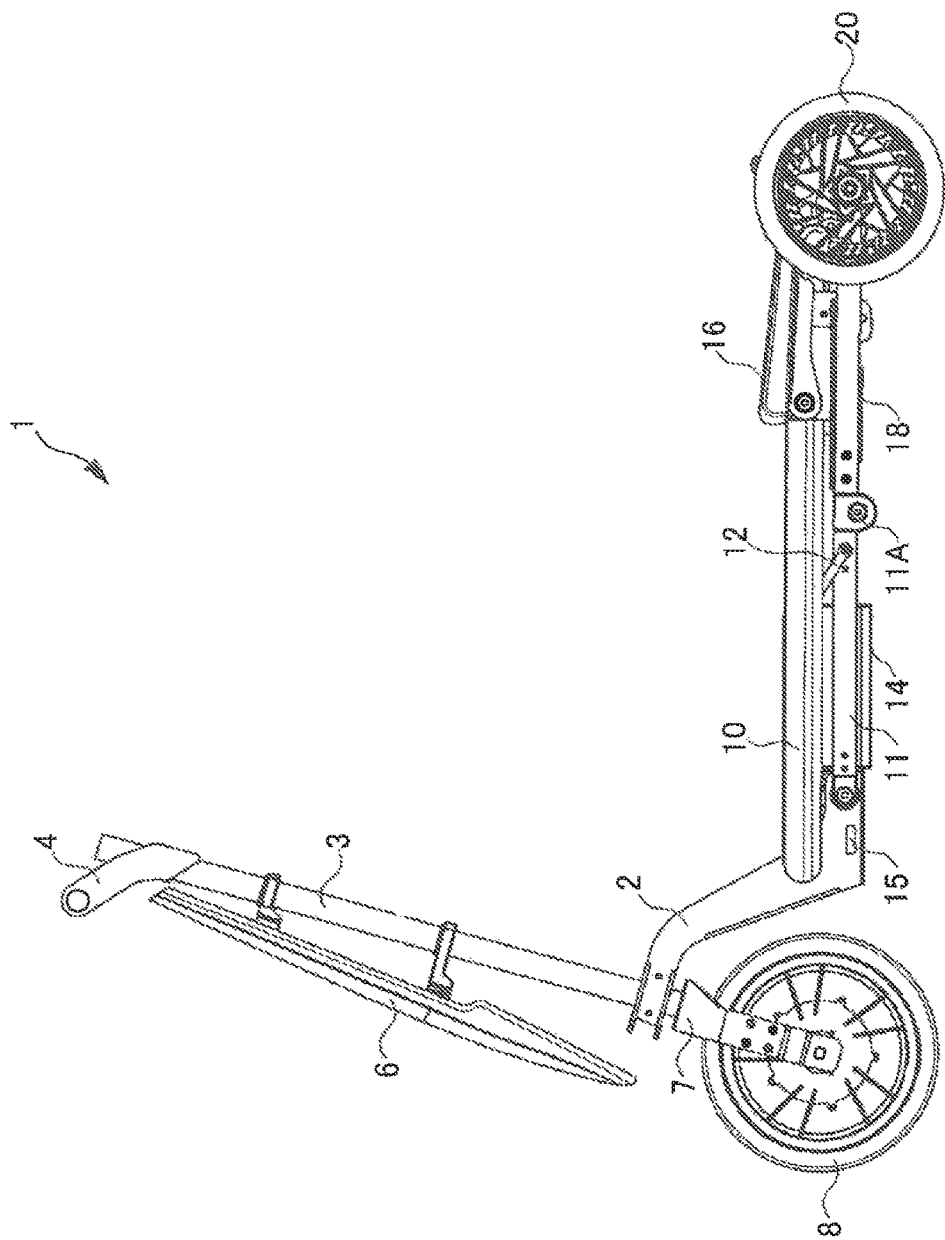
FIG. 5 is a side view of the folding vehicle set in a standing driving mode.

When the seated driving mode illustrated in FIGS. 1 and 2 transitions to the standing driving mode illustrated in FIGS. 5 and 6, the following operation is performed. Specifically, as in the case described above, the release lever 24 is pulled in the right direction in FIG. 7B to release the locking between the base frame 2 and the main frame mechanism 9, and the engagement between the engaged portion 21B of the striker 21 and the hook portion 23A of the hook member 23 is released, whereby the first lock mechanism L1 is unlocked. The second frame member 11 and the swing arm. 18 are pivoted with respect to each other to detach the stopper engaging portion 25A of the rod member 25 from the stopper member 18A of the swing arm 18, whereby the second lock mechanism L2 is unlocked. Furthermore, the release lever 29 is pulled in the right direction in FIGS. 9A and 9B to release the engagement between the engaged portion 26A of the striker 26 and the hook portion 28A of the hook member 28, whereby the third lock mechanism L3 is further unlocked.

The main frame mechanism 9, which has become pivotable with respect to the base frame 2 as a result of the above process, is pivoted in a direction for moving away from the front frame 3 as illustrated in FIG. 10. In this process, the second lock mechanism L2 is unlocked, and thus the swing arm 18 moves away from the front frame 3 as the main frame mechanism 9 pivots. Thus, the main frame mechanism 9 and the swing arm 18 are in the standing driving mode as illustrated in FIG. 11.

In the standing driving mode, the engaged portion 21B of the striker 21 in the first lock mechanism L1 is set up in the U-shaped groove 22A of the receiving member 22, arid the hook portion 23A of the hook member 23 is engaged with the engaged portion 21B of the striker 21. The engaged portion 32 of the striker 30 pivotally supported at the swing arm 18 is set up in the U-shaped groove 27A of the receiving member 27 in the third lock mechanism L3, and the hook member 28 is pivoted in the counterclockwise direction by the urging force of the spring, whereby the third lock mechanism L3 is locked.

Figure 11:
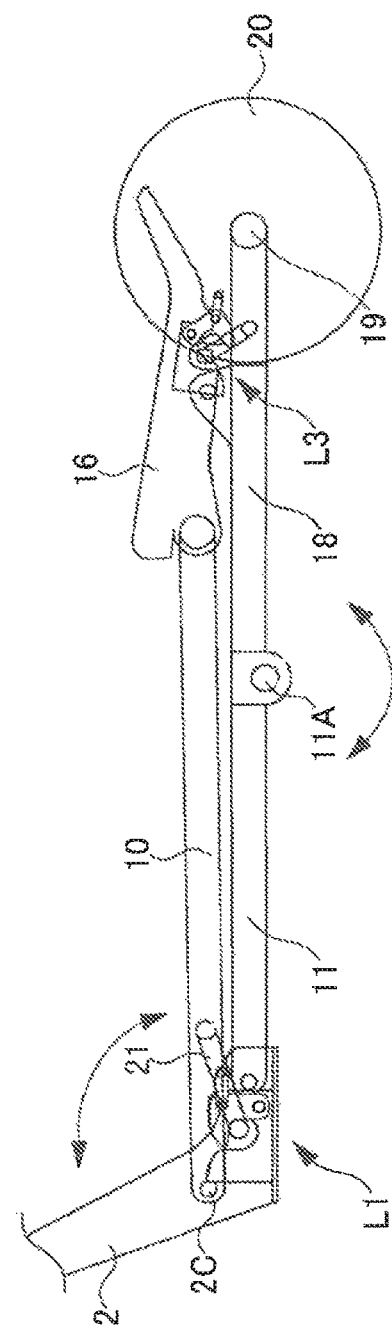
FIG. 11 is a diagram schematically illustrating a locked state of the first lock mechanism and the third lock mechanism in the standing driving mode of the folding vehicle.

Thus, in the standing driving mode, the base frame 2 and the main frame mechanism 9 as well as the main frame mechanism 9 and the swing arm 18 can be locked with each other in a state illustrated in FIG. 11. Thus, the driver on the board 13 can enjoy safe standing driving.

As described above, the folding vehicle 1 according to the present embodiment is configured to be switchable among: the folded mode achieved with the main frame mechanism 9 pivoted toward the front frame 3 to be folded; the seated driving mode, enabling driving while being seated on the saddle member 16, achieved by pivoting the main frame mechanism 9 from the front frame 3 in the folded mode; and the standing driving mode, enabling driving while standing, achieved by pivoting the main frame mechanism 9 in the seated driving mode. The saddle member 16, attached to the upper end portions of the first frame member 10 and the second frame member 11 in the main frame mechanism 9, remains to be in the state of being attached to the upper end portions of the first frame member 10 and the second frame member 11 in the folded mode and in the seated driving mode, with the locking function of the third lock mechanism L3. When the seated driving mode transitions to the standing driving mode, the third lock mechanism L3 is unlocked, and thus the saddle member 16 is retracted to a portion of the swing arm 18 on the side of the rear wheel 20 as the main frame mechanism 9 pivots. Thus, the saddle member 16 can be certainly prevented from being lost without being obstructive in the standing driving mode.

The first lock mechanism L1 is provided between the base frame 2 and the first frame member 10 and the second lock mechanism L2 is provided between the second frame member 11 and the swing arm 18. The first lock mechanism L1 and the second lock mechanism L2 cooperate to maintain the seated driving mode enabling driving while being seated on the saddle member 16. Thus, seated driving can be safely performed with the saddle member 16 stably maintained. In the standing driving mode, the base frame 2 and the first frame member 10 are locked with each other with the first lock mechanism L1, and the striker 30 pivotally supported by the swing arm 18 is locked with the third lock mechanism L1. Thus, the board 13 is stably maintained with the saddle member 16 in the standing driving mode retracted to a portion of the swing arm 18 on the side of the rear wheel 20, whereby standing driving can be safely performed on the board 13.

When the main frame mechanism 9 is pivoted toward the front frame 3, the engaged portion 32 of the striker 30 pivotally supported at the swing arm 18 is engaged with the hook portion 23A of the first hook member 23 in the first lock mechanism L1 for maintaining the fold mode. Thus, the folded mode can be stably maintained with the main frame mechanism 9 and the front frame 3 certainly locked with each other.

The release lever 24 is attached to the hook member 23 in the first lock mechanism L1 With the release lever 24, the engagement between the hook portion 23A of the hook member 23 and the engaged portion 21B of the striker 21 is released. Thus, the first lock mechanism can be unlocked by releasing the engagement between the hook portion 23A of the hook member 23 and the engaged portion 21B of the striker 21 by operating the release lever 24. Then, the main frame mechanism 9 can be pivoted with respect to the front frame 3 from the folded mode to the seated driving mode.

The locking of the striker 26, attached to the second frame member 11, by the third lock mechanism L3 can be released as follows. Specifically, the third lock mechanism L3 can be unlocked by releasing the engagement between the hook portion 28A of the hook member 28 and the engaged portion 26A of the striker 26 by operating the release lever 29 coupled to the hook member 28. Then, the main frame mechanism 9 can be pivoted with respect to the front frame 3, together with the swing arm 18.

The present embodiment does not limit the present invention. It is a matter of course that the embodiment can be improved and modified in various ways without departing from the gist of the present invention.

The brake levers provided to both sides of the handle 4, wiring between the brake levers and brakes, wiring for a power supply for driving a motor, and the like which are omitted in the present embodiment may be appropriately set in the actual implementation.

In the present embodiment, the third lock mechanism L3 needs to be unlocked when the folding vehicle 1 is set to the standing driving mode. As described above, the standing driving mode may be achieved with the state of locking the saddle member 16 to the first frame member 10 and the second frame member 11 maintained and without unlocking the third lock mechanism L3, by appropriately setting the attachment positions of the first frame member 10 and the second frame member 11, forming the parallel link mechanism, on the base frame 2, and the attachment condition of the saddle member 16 to the first frame member 10 and the second frame member 11.

The following description is the list of aspects of the embodiments of the present application.

The first folding vehicle is a folding vehicle including a front frame, the front frame including: an upper end to which a handle is attached; and a lower end to which a front wheel is attached; a based frame by which the front frame is pivotally supported; a main frame mechanism, the main frame mechanism including: a first frame member pivotally supported with respect to the base frame; and a second frame member arranged in parallel with the first frame member, wherein the first frame member and the second frame member form a parallel link mechanism; a board attached to the main frame mechanism; a saddle member attached to at least one of an upper end portion of the first frame member and an upper end portion of the second frame member of the main frame mechanism; and a swing arm, the swing arm including: one end pivotally supported by the main frame mechanism; and another end by which a pair of rear wheels are rotatably supported, wherein the folding vehicle is switchable among: a first mode, in which the main frame mechanism is folded, achieved by pivoting the main frame mechanism toward the front frame; a second mode, in which driving while being seated on the saddle member is enabled, achieved by pivoting the main frame mechanism in the first mode; and a third mode, in which driving while standing on the board is enabled, achieved by pivoting the main frame mechanism in the second mode, and wherein the saddle member remains to be in a state of being attached to at least one of the upper end portion of the first frame member and the upper end portion of the second frame member in the first mode, the second mode, and the third mode.

The second folding vehicle is the first folding vehicle further including: a first lock mechanism that is provided between the base frame and the first frame member, the first lock mechanism including: a first striker member that is pivotally supported by the first frame member and provided with an engaged portion; and a first hook member that is provided to the base frame, pivotally supported and provided with a hook portion capable of engaging with the engaged portion of the first striker member; and a second lock mechanism that is provided between the second frame member and the swing arm, the second lock mechanism including: a rod member, the rod member including: one end pivotally supported by the second frame member; and another end provided with a stopper engaging portion; and a stopper member that is provided to the swing arm and to which the stopper engaging portion is engaged, wherein the first lock mechanism and the second lock mechanism cooperate to maintain the second mode.

The third folding vehicle is the second folding vehicle further including a third lock mechanism, the third lock mechanism including: a second striker member that is pivotally supported at a portion near a rear end of the swing arm and provided with an engaged portion; and a second hook member that is provided to the saddle member, provided with a hook portion capable of engaging with the engaged portion of the second striker member and pivotally supported, wherein when the main frame mechanism is pivoted in the second mode, the first lock mechanism and the third lock mechanism cooperate to maintain the third mode.

The fourth folding vehicle is the third folding vehicle, wherein when the main frame mechanism is pivoted toward the front frame, the engaged portion of the second striker member in the third lock mechanism engages with the hook portion of the first hook member in the first lock mechanism to maintain the first mode.

The fifth folding vehicle is the second folding vehicle further including a first release lever that is attached to the first hook member and with which engagement between the hook portion of the first hook member and the engaged portion of the first striker member is released.

The sixth folding vehicle is the third folding vehicle further including a second release lever that is attached to the second hook member and with which engagement between the hook portion of the second hook member and the engaged portion of the second striker member is released.

The first folding vehicle is configured to be switchable among: the first mode achieved with the main frame mechanism pivoted toward the front frame to be folded; the second mode, enabling driving while being seated on the saddle member, achieved by pivoting the main frame mechanism in the first mode; and the third mode, enabling driving while standing on the board, achieved by pivoting the main frame mechanism in the second mode, and the saddle member remains to be in the state of being attached to at least one of the upper end portion of the first frame member and the upper end portion of the second frame member in the first mode, the second mode, and the third mode. When the second mode transitions to the third mode, the saddle member is retracted to a portion of the swing arm on the side of the rear wheel as the main frame mechanism pivots. Thus, the saddle member can be certainly prevented from being lost without being obstructive in a standing driving mode, which corresponds to the third mode.

The second folding vehicle includes the first lock mechanism that is provided between the base frame and the first frame member and the second lock mechanism that is provided between the second frame member and the swing arm, and the first lock mechanism and the second lock mechanism cooperate to maintain the second mode, enabling driving while being seated on the saddle member. Thus, seated driving can be safely performed with the saddle member stably maintained.

The third folding vehicle includes the third lock mechanism that is provided between the saddle member and the swing arm, and when the main frame mechanism is pivoted in the second mode, the first lock mechanism and the third lock mechanism cooperate to maintain the third mode, enabling driving while standing. Thus, the board is stably maintained with the saddle member retracted to the portion of the swing arm on the side of the rear wheel, whereby standing driving can be safely performed on the board.

In the fourth folding vehicle, when the main frame mechanism is pivoted toward the front frame, the engaged portion of the second striker member in the third lock mechanism is engaged with the hook portion of the first hook member in the first lock mechanism for maintaining the first mode. Thus, the first mode can be stably maintained with the main frame mechanism and the front flame certainly locked with each other.

The fifth folding vehicle includes the first release lever with which engagement between the hook portion of the first hook member and the engaged portion of the first striker member is released, the first release lever being attached to the first hook member. Thus, the first lock mechanism can be unlocked by releasing the engagement between the hook portion of the first hook member and the engaged portion of the first striker member by operating the first release lever. Then, the main frame mechanism can be pivoted with respect to the front frame.

The sixth folding vehicle includes the second release lever with which engagement between the hook portion of the second hook member and the engaged portion of the second striker member is released, the second release lever being attached to the second hook member. Thus, the third lock mechanism can be unlocked by releasing the engagement between the hook portion of the second hook member and the engaged portion of the second striker member by operating the second release lever. Then, the main frame mechanism can be pivoted with respect to the front frame, together with the swing arm.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A folding vehicle comprising:
   a front frame including:
      an upper end to which a handle is attached; and
      a lower end to which a front wheel is attached;
   a base frame that pivotally supports the front frame;
   a main frame mechanism including:
      a first frame member pivotally supported with respect to the base frame; and a second frame member arranged in parallel with the first frame member, the first frame member and the second frame member forming a parallel link mechanism;
a board attached to the main frame mechanism;
a saddle member attached to at least one of an upper end portion of the first frame member and an upper end portion of the second frame member of the main frame mechanism; and
a swing arm including:
a first end pivotally supported by the main frame mechanism; and
a second end rotatably supporting a pair of rear wheels, wherein:
the folding vehicle being switchable among:
a first mode, in which the main frame mechanism is folded, the first mode being achieved by pivoting the main frame mechanism toward the front frame;
a second mode, in which driving while being seated on the saddle member is enabled, the second mode being achieved by pivoting the main frame mechanism in the first mode; and
a third mode, in which driving while standing on the board is enabled, the third mode being achieved by retracting the saddle member between the pair of rear wheels by pivoting the main frame mechanism in the second mode, and
the saddle member remains attached to at least one of the upper end portion of the first frame member and the upper end portion of the second frame member in the first mode, the second mode, and the third mode.

2. The folding vehicle according to claim 1, further comprising:
a first lock mechanism that is provided between the base frame and the first frame member, the first lock mechanism including:
a first striker member that is pivotally supported by the first frame member and provided with an engaged portion; and
a first hook member that is provided to the base frame, the first hook member being pivotally supported and provided with a hook portion configured to engage with the engaged portion of the first striker member; and a second lock mechanism that is provided between the second frame member and the swing arm, the second lock mechanism including:
a rod member including:
a first end pivotally supported by the second frame member; and
a second end provided with a stopper engaging portion; and
a stopper member that is provided to the swing arm and to which the stopper engaging portion is engaged,
wherein the first lock mechanism and the second lock mechanism cooperate to maintain the second mode.

3. The folding vehicle according to claim 2, further comprising:
a third lock mechanism including:
a second striker member that is pivotally supported at a portion near a rear end of the swing arm and provided with an engaged portion; and
a second hook member that is provided to the saddle member, the second hook member being provided with a hook portion configured to engage with the engaged portion of the second striker member, and the second hook member is pivotally supported,
wherein when the main frame mechanism is pivoted in the second mode, the first lock mechanism and the third lock mechanism cooperate to maintain the third mode.

4. The folding vehicle according to claim 3, wherein, in the first mode, when the main frame mechanism is pivoted toward the front frame, the engaged portion of the second striker member in the third lock mechanism engages with the hook portion of the first hook member in the first lock mechanism to maintain the first mode.

5. The folding vehicle according to claim 2, further comprising a first release lever that is attached to the first hook member, the first release lever being configured to release engagement between the hook portion of the first hook member and the engaged portion of the first striker member.

6. The folding vehicle according to claim 3, further comprising a second release lever that is attached to the second hook member, the second release lever being configured to release engagement between the hook portion of the second hook member and the engaged portion of the second striker member.

* * * * *